US012611982B2

(12) United States Patent
Peng et al.

(10) Patent No.: US 12,611,982 B2
(45) Date of Patent: Apr. 28, 2026

(54) VEHICLE AUXILIARY APPARATUS AND VEHICLE AUXILIARY METHOD

(71) Applicant: Qisda Corporation, Taoyuan City (TW)

(72) Inventors: Szu Chen Peng, Taoyuan City (TW); Chih-Hung Wu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 90 days.

(21) Appl. No.: 18/637,463

(22) Filed: Apr. 17, 2024

(65) Prior Publication Data

US 2024/0416830 A1    Dec. 19, 2024

(30) Foreign Application Priority Data

Jun. 15, 2023    (CN) .......................... 202310709887.0

(51) Int. Cl.
*B60Q 7/00*        (2006.01)
*B60K 35/28*       (2024.01)
(Continued)

(52) U.S. Cl.
CPC .............. *B60Q 1/535* (2022.05); *B60K 35/28* (2024.01); *B60Q 1/0023* (2013.01); *B60Q 1/30* (2013.01);
(Continued)

(58) Field of Classification Search
CPC ........ A61B 5/14552; A61B 2560/0443; A61B 2562/0233; A61B 2562/164; A61B 2562/227; A61B 5/681; A61B 2560/0214; A61B 5/14542; A61B 5/1459; A61B 17/02; A61B 2017/0262; A61B 2560/0266; A61B 2562/223; A61B 2562/225; A61B 5/0002; A61B 5/0022; A61B 5/0086; A61B 5/6846; A61B 5/742; A61B 5/0261;
(Continued)

(56) References Cited

U.S. PATENT DOCUMENTS

| | | | | |
|---|---|---|---|---|
| 5,637,996 A | * | 6/1997 | McDarren | A63F 9/143 446/175 |
| 6,404,506 B1 | * | 6/2002 | Cheng | G01B 11/04 356/615 |

(Continued)

FOREIGN PATENT DOCUMENTS

| | | |
|---|---|---|
| CN | 108621909 | 10/2018 |
| CN | 108791038 | 11/2018 |

(Continued)

*Primary Examiner* — Daniel Previl

(57) ABSTRACT

A vehicle auxiliary apparatus and a vehicle auxiliary method are provided. The vehicle auxiliary apparatus includes: a first optical sensor disposed on a first side in a moving direction of a vehicle, a second optical sensor disposed on a second side different from the first side in the moving direction of the vehicle, a projection system, and a processor. The processor is configured to measure a first vehicle speed of a first moving vehicle other than the vehicle through the first optical sensor, measure a second vehicle speed of a second moving vehicle other than the vehicle through the second optical sensor, and control the projection system to perform a warning projection within a projection range based on the first vehicle speed, the second vehicle speed, and a vehicle speed of the vehicle.

18 Claims, 5 Drawing Sheets

(51) Int. Cl.

| | |
|---|---|
| *B60Q 1/00* | (2006.01) |
| *B60Q 1/30* | (2006.01) |
| *B60Q 1/50* | (2006.01) |
| *B60W 50/14* | (2020.01) |
| *G06V 20/58* | (2022.01) |

(52) U.S. Cl.
CPC ............. *B60W 50/14* (2013.01); *G06V 20/58* (2022.01); *B60K 2360/178* (2024.01); *B60K 2360/334* (2024.01); *B60K 2360/785* (2024.01); *B60Q 2400/50* (2013.01); *B60W 2050/146* (2013.01); *B60W 2420/403* (2013.01); *B60W 2554/4042* (2020.02); *B60W 2554/802* (2020.02)

(58) Field of Classification Search
CPC ... A61B 5/0205; A61B 5/0295; A61B 1/0051; A61B 1/009; A61B 1/31; A61B 2034/2061; A61B 5/0073; A61B 5/06; A61B 5/065; A61B 5/1455; A61B 2090/3908; A61B 2090/3937; A61B 2090/3966; A61B 2560/0425; A61B 2562/0238; A61B 2562/242; A61B 2562/247; A61B 5/0075; A61B 5/0091; A61B 5/02; A61B 5/02416; A61B 5/0245; A61B 5/1075; A61B 5/1171; A61B 5/1172; A61B 5/14551; A61B 5/413; A61B 5/445; A61B 5/6852; A61B 5/6887; A61B 5/708; A61B 5/7235; A61B 6/0414; A61B 6/0492; A61B 6/4266; A61B 6/4417; A61B 6/502; A61B 6/5235; H04N 23/55; H04N 23/57; H04N 23/54; H04N 23/687; H04N 23/45; H04N 23/56; H04N 13/239; H04N 23/667; H04N 23/51; H04N 13/211; H04N 13/25; H04N 13/254; H04N 13/257; H04N 13/271; H04N 23/58; H04N 23/698; H04N 25/00; H04N 1/6027; H04N 23/10; H04N 23/11; H04N 23/52; H04N 23/62; H04N 23/635; H04N 23/64; H04N 23/70; H04N 23/88; H04N 23/90; H04N 25/773; H04N 1/00689; H04N 1/0071; H04N 1/00732; H04N 1/00734; H04N 1/00755; H04N 1/00771; H04N 1/00779; H04N 1/0464; H04N 1/1017; H04N 1/12; H04N 1/121; H04N 1/193; H04N 1/203; H04N 1/2032; H04N 1/506; H04N 13/207; H04N 2201/0471; H04N 2201/04722; H04N 2201/04729; H04N 2201/04731; H04N 2201/04732; H04N 2201/04749; H04N 2201/04758; H04N 23/23; H04N 23/60; H04N 23/67; H04N 23/675; H04N 25/131; H04N 7/183; G02B 7/08; G02B 27/646; G02B 26/0816; G02B 27/106; G02B 27/141; G02B 7/006; G02B 7/14; G02B 13/0065; G02B 3/14; G02B 6/262; G02B 7/04; G02B 7/09; G02B 13/06; G02B 17/0808; G02B 17/0816; G02B 2006/12138; G02B 2027/0138; G02B 2027/0178; G02B 23/2476; G02B 27/0093; G02B 27/0176; G02B 27/64; G02B 6/12016; G02B 6/12019; G02B 6/4215; G02B 7/021; G02B 7/105; G02B 7/182; G02B 17/0856; G02B 26/004; G02B 7/1821; H01L 25/167; H01L 23/49838; H01L 25/0655; H01L 25/165;

H10F 77/407; H10F 77/50; H10F 55/18; H10F 55/255; H10F 77/40; H10F 77/413; H10F 39/802; H10F 39/12; H10F 39/804; H10F 39/182; H10F 39/184; H10F 39/191; H10F 30/10; H10F 39/018; H10F 39/024; H10F 39/806; H10F 55/25; H10F 71/00; H10F 77/93; H10F 77/933; G06V 10/147; G06V 40/23; G06V 40/12; G06V 40/14; G06V 40/70; G06V 10/95; G06V 20/20; G06V 20/54; G06V 20/56; G06V 2201/07; G06V 2201/08; G06V 10/00; G06V 20/00; G06V 30/00; G06V 40/00; G06V 2201/00; G08G 1/09; G08G 1/01; G08G 1/07; G08G 1/095; G08G 1/04; G08G 3/00; G08G 1/00; G08G 5/00; G08G 7/00; G08G 9/00; G08G 99/00; B60K 2360/165; B60K 2360/334; B60K 2360/66; B60K 35/10; B60K 35/22; B60K 35/28; B60K 35/50; B60K 35/53; B60K 35/60; B60K 3/00; B60K 1/00; B60K 5/00; B60K 6/00; B60K 7/00; B60K 8/00; B60K 11/00; B60K 13/00; B60K 15/00; B60K 16/00; B60K 17/00; B60K 20/00; B60K 25/00; B60K 23/00; B60K 26/00; B60K 28/00; B60K 31/00; B60K 35/00; B60K 37/00; B60K 2310/00; B60K 2360/00; B60K 2700/00; B60K 2702/00; B60K 2704/00; B60Q 1/076; B60Q 1/44; B60Q 1/5037; B60Q 1/507; B60Q 1/52; B60Q 2400/20; B60Q 2400/50; B60Q 2900/30; B60Q 3/14; B60Q 3/54; B60Q 3/60; B60Q 3/76; B60Q 1/00; B60Q 3/00; B60Q 5/00; B60Q 7/00; B60Q 9/00; B60Q 11/00; B60Q 2200/00; B60Q 2300/00; B60Q 2400/00; B60Q 2500/00; B60Q 2800/00; B60Q 2900/00; B60R 16/03; B60R 1/00; B60R 3/00; B60R 5/00; B60R 7/00; B60R 9/00; B60R 11/00; B60R 13/00; B60R 15/00; B60R 16/00; B60R 17/00; B60R 19/00; B60R 21/00; B60R 22/00; B60R 25/00; B60R 99/00; B60R 2225/00; B60R 2300/00; B60R 2325/00; F21S 41/25; F21S 2/00; F21S 4/00; F21S 6/00; F21S 8/00; F21S 9/00; F21S 10/00; F21S 11/00; F21S 13/00; F21S 15/00; F21S 19/00; F21S 41/00; F21S 43/00; F21S 45/00; F21S 2217/00; F21S 2243/00

USPC ..... 340/471–478, 488, 505–506, 525, 545.3, 340/551, 555, 568.8, 588, 619, 615, 340/636.11

See application file for complete search history.

(56) References Cited

U.S. PATENT DOCUMENTS

| | | | | |
|---|---|---|---|---|
| 10,073,336 | B2 * | 9/2018 | Maes ..................... | G03B 17/54 |
| 11,933,888 | B2 * | 3/2024 | Alliot ................... | G01S 7/2955 |
| 2009/0213359 | A1 * | 8/2009 | Fourcault ............... | G01S 17/58 |
| | | | | 356/28 |
| 2010/0302158 | A1 * | 12/2010 | Fang ....................... | G01P 3/36 |
| | | | | 382/103 |

(56)  References Cited

U.S. PATENT DOCUMENTS

2017/0075092  A1*   3/2017  Kim ..................... H04N 23/667
2021/0254807  A1*   8/2021  Bhakta .................. F21S 41/675

FOREIGN PATENT DOCUMENTS

CN      108944655      12/2018
CN      113442826       9/2021
CN      114889522       8/2022

* cited by examiner

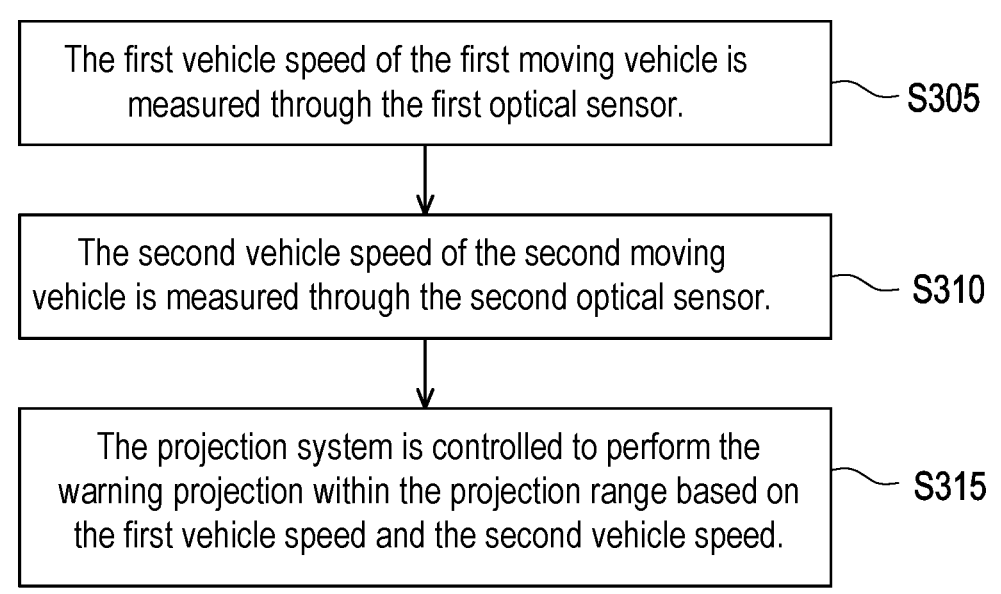

| The first vehicle speed of the first moving vehicle is measured through the first optical sensor. | S305 |
| The second vehicle speed of the second moving vehicle is measured through the second optical sensor. | S310 |
| The projection system is controlled to perform the warning projection within the projection range based on the first vehicle speed and the second vehicle speed. | S315 |

FIG. 3

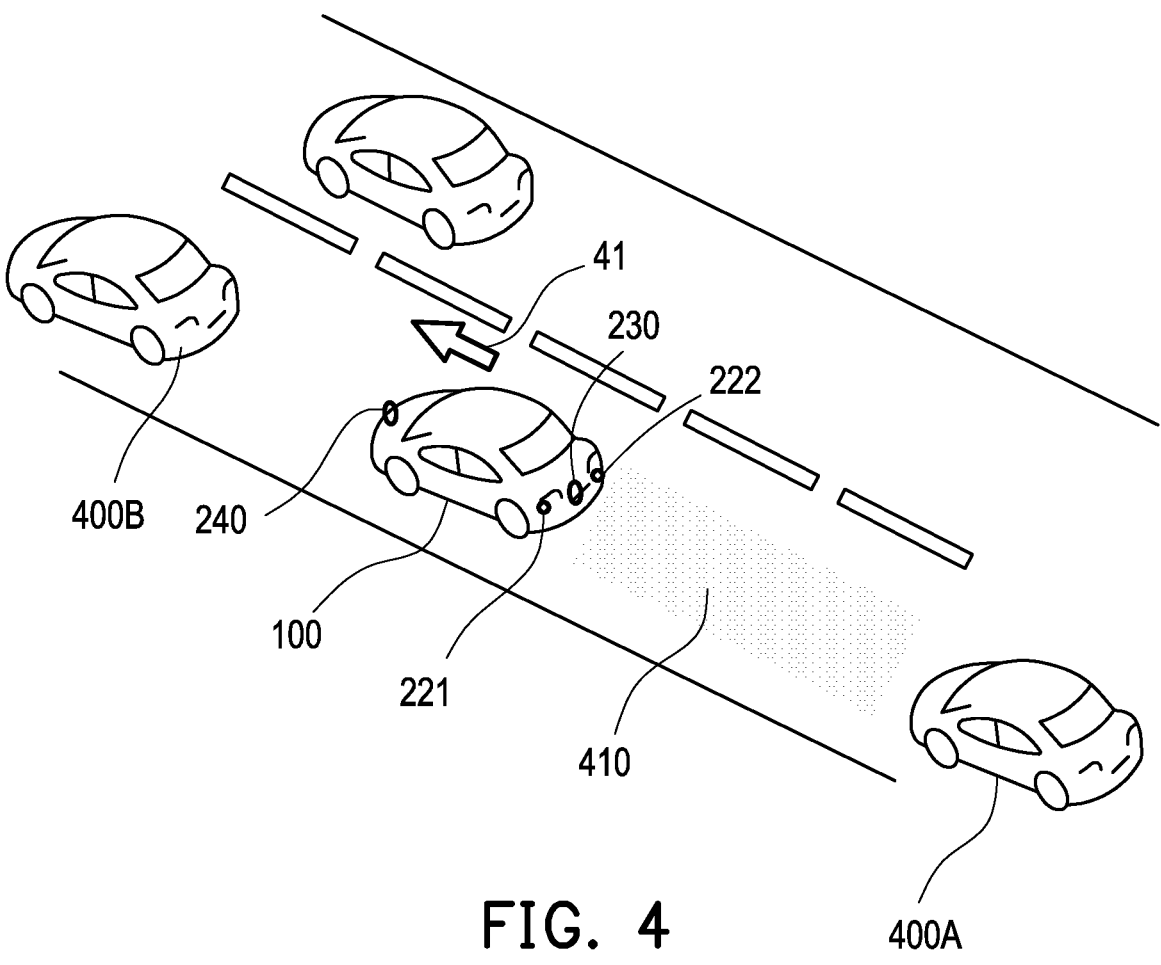

FIG. 4

VEHICLE AUXILIARY APPARATUS AND VEHICLE AUXILIARY METHOD

CROSS-REFERENCE TO RELATED APPLICATION

This application claims the priority benefit of China application serial no. 202310709887.0, filed on Jun. 15, 2023. The entirety of the above-mentioned patent application is hereby incorporated by reference herein and made a part of this specification.

BACKGROUND

Technical Field

The disclosure relates to a vehicle auxiliary mechanism, and in particular to a vehicle auxiliary apparatus and a vehicle auxiliary method.

Description of Related Art

Generally speaking, due to the high vehicle speed on the highway, emergency braking tends to cause loss of control and rollover, and what's more, the driver of the rear vehicle may not be able to react in time and cause a series of chases. Therefore, the Ministry of Transportation recommends drivers not to brake sharply and to avoid traveling at a slow speed and blocking other vehicles on the road, unless the situation is really urgent. The driver should brake gently and slow down at a safe distance when there is a situation. When braking, the driver is advised to pay attention to the vehicle coming from behind to increase the reaction time for other drivers and prevent a collision.

However, as vehicles are traveling fast, the driver of the rear vehicle may be unable to react immediately to the situation of the front vehicle due to the blocked vision. Besides, since the situation often occurs suddenly, the driver's intuitive reaction of slamming on the brake may be inevitable. There is almost no room for judgment in the reaction time of the driver of the rear vehicle, which can easily lead to a collision. In addition, in the case where the driver can only concentrate on the front vehicle and pay insufficient attention to the rear vehicle, for example, driving at night, accidents such as collision with the rear vehicle often occur when the driver of the vehicle brakes sharply. It is believed that giving appropriate warnings to the rear vehicle in an effective way will allow the driver of the rear vehicle to anticipate the braking and reduce the risk of collision.

SUMMARY

The disclosure provides a vehicle auxiliary apparatus and a vehicle auxiliary method, which provide the rear vehicle real-time warning and identification to reduce the risk of collision.

The vehicle auxiliary apparatus of the disclosure includes: a first optical sensor disposed on a first side in a moving direction of a vehicle, a second optical sensor disposed on a second side in the moving direction of the vehicle, where the second side is different from the first side, a projection system, and a processor coupled to the first optical sensor, the second optical sensor, and the projection system. The processor is configured to: measure a first vehicle speed of the first moving vehicle other than the vehicle through the first optical sensor, measure a second vehicle speed of the second moving vehicle other than the vehicle through the second optical sensor, and control the projection system to perform a warning projection within a projection range based on the first vehicle speed, the second vehicle speed, and a vehicle speed of the vehicle.

In an embodiment of the disclosure, the processor is configured to: calculate a braking distance based on the first vehicle speed, the second vehicle speed, and the vehicle speed, calculate an adjustment angle based on a height of the projection system and a road surface and the braking distance, and adjust a projection angle of each projection apparatus by driving a motor corresponding to each projection apparatus in the projection system based on the adjustment angle, so that each projection apparatus projects a projection pattern within the projection range at the projection angle.

In an embodiment of the disclosure, the first moving vehicle is located behind the vehicle, and the second moving vehicle is located in front of the vehicle. The processor is configured to: calculate a first distance based on the first vehicle speed, a first instantaneous acceleration, and the vehicle speed, where the first instantaneous acceleration is obtained by measuring the first moving vehicle through the first optical sensor, calculate a second distance based on the second vehicle speed, the vehicle speed, and a vehicle instantaneous acceleration of the vehicle, and obtain the braking distance based on the first distance and the second distance.

In an embodiment of the disclosure, the processor is configured to: calculate a braking distance based on the first vehicle speed, the second vehicle speed, and the vehicle speed, add the braking distance and at least one retention distance to obtain a warning distance, calculate an adjustment angle based on a height of the projection system and a road surface and the warning distance, and adjust a projection angle of each projection apparatus by driving a motor corresponding to each projection apparatus in the projection system based on the adjustment angle, so that each projection apparatus projects a projection pattern within the projection range at the projection angle. The projection pattern includes a main area and at least one secondary area. The main area corresponds to the braking distance, and the at least one secondary area corresponds to the at least one retention distance. The main area and the at least one secondary area have different visual presentations.

In an embodiment of the disclosure, the first moving vehicle is located behind the vehicle, and the second moving vehicle is located in front of the vehicle. The processor is configured to: calculate a relative acceleration based on a first instantaneous acceleration of the first moving vehicle and a vehicle instantaneous acceleration of the vehicle, calculate a reference speed based on the relative acceleration, a current distance between the vehicle and the first moving vehicle, and the vehicle speed, and present the reference speed on a rear windshield of the vehicle through a display technology.

In an embodiment of the disclosure, the processor is configured to: calculate a warning time based on the current distance between the vehicle and the first moving vehicle and the first vehicle speed, and present the warning time on the rear windshield through the display technology.

In an embodiment of the disclosure, the vehicle auxiliary apparatus further includes: an in-vehicle projection apparatus coupled to the processor and configured to project the reference speed onto the rear windshield.

In an embodiment of the disclosure, the rear windshield is equipped with a display, and the display is coupled to the processor. The processor is configured to output the reference speed to the display.

In an embodiment of the disclosure, the processor is configured to: determine whether to perform the warning projection through the projection system based on whether the vehicle speed is greater than a preset value, where the warning projection is performed in response to the vehicle speed of the vehicle being greater than the preset value, and the warning projection is not performed in response to the vehicle speed of the vehicle being not greater than the preset value, or determine whether to perform the warning projection through the projection system based on whether a distance between the vehicle and the first moving vehicle located behind the vehicle is greater than a safe distance, where the warning projection is performed in response to the distance being not greater than the safe distance, and the warning projection is not performed in response to the distance being greater than the safe distance.

In an embodiment of the disclosure, the projection system includes two projection apparatuses respectively disposed on two rear lights of the vehicle.

The vehicle auxiliary method of the disclosure is executed by a processor. The vehicle auxiliary method includes: measuring a first vehicle speed of a first moving vehicle other than a vehicle through a first optical sensor, where the first optical sensor is disposed on a first side in a moving direction of the vehicle, measuring a second vehicle speed of a second moving vehicle other than the vehicle through a second optical sensor, where the second optical sensor is disposed on a second side in the moving direction of the vehicle, and the second side is different from the first side, and controlling a projection system disposed in the vehicle to perform a warning projection within a projection range based on the first vehicle speed, the second vehicle speed, and a vehicle speed of the vehicle.

Based on the above, the disclosure achieves an effect of increasing driving safety by calculating the safe distance between the vehicle and the front vehicle, calculating the safe distance between the vehicle and the rear vehicle, and performing the projection to the rear to warn the rear vehicle.

BRIEF DESCRIPTION OF THE DRAWINGS

FIG. 3 is a flow chart of a vehicle auxiliary method according to an embodiment of the disclosure.

FIG. 4 is a schematic diagram of vehicle driving conditions according to an embodiment of the disclosure.

DESCRIPTION OF THE EMBODIMENTS

Figure 1:
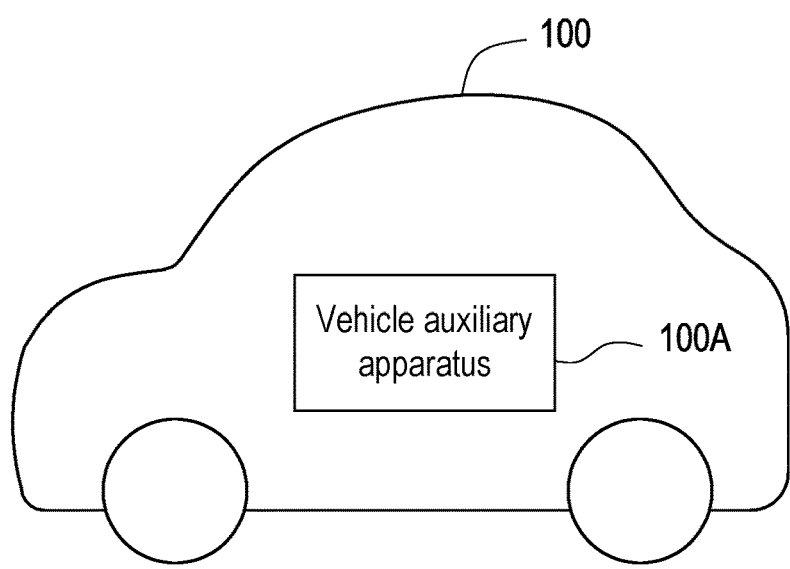
FIG. 1 is a schematic diagram of a vehicle according to an embodiment of the disclosure.
Figure 2:
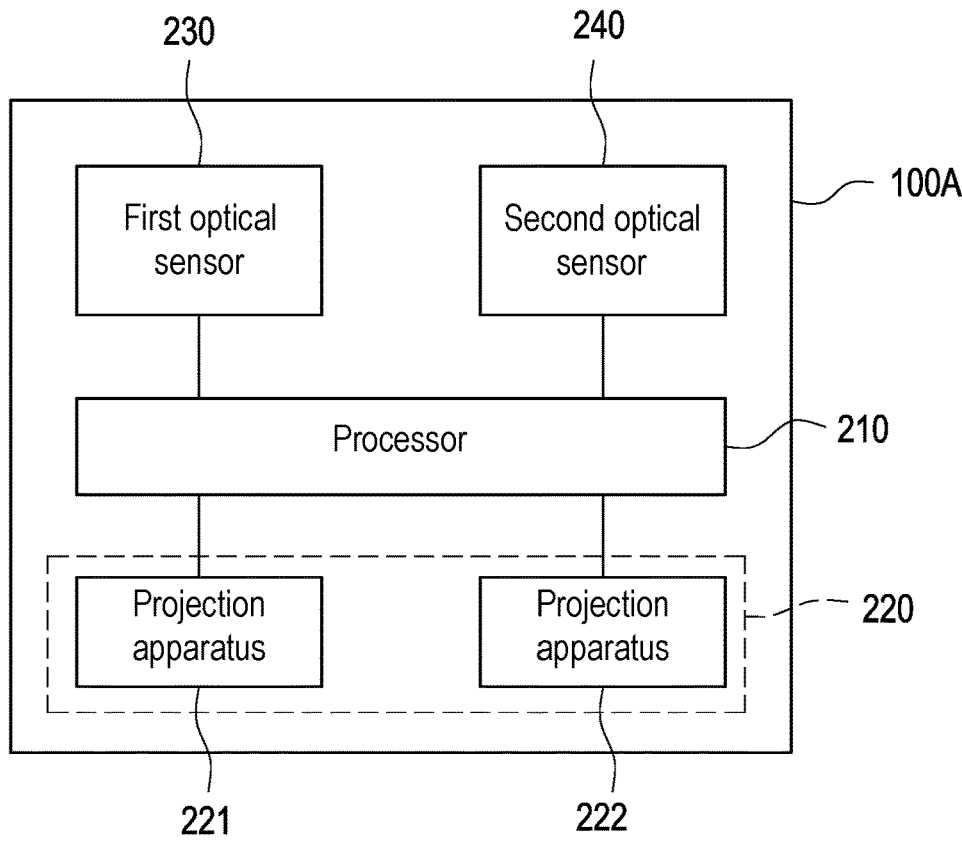
FIG. 2 is a block diagram of a vehicle auxiliary apparatus according to an embodiment of the disclosure.

FIG. 1 is a schematic diagram of a vehicle according to an embodiment of the disclosure. FIG. 2 is a block diagram of a vehicle auxiliary apparatus according to an embodiment of the disclosure. Referring to FIG. 1 and FIG. 2, a vehicle 100 is disposed with a vehicle auxiliary apparatus 100A. The vehicle auxiliary apparatus 100A includes a processor 210, a projection system 220, a first optical sensor 230, and a second optical sensor 240. The processor 210 is coupled to the projection system 220, the first optical sensor 230, and the second optical sensor 240.

The processor 210 is, for example, a central processing unit (CPU), a physical processing unit (PPU), a microprocessor, an embedded control chip, a digital signal processor (DSP), an application specific integrated circuit (ASIC) or other similar apparatuses.

The projection system 220 includes at least one projection apparatus. In this embodiment, two projection apparatuses 221 and 222 are illustrated. However, the disclosure is not limited thereto. The number of projection apparatuses may be determined according to actual conditions. Each projection apparatus 221 and 222 includes physical hardware components such as a control chip, an optical engine module, a light source module, and a projection lens. The control chip is coupled to the optical engine module and the light source module, drives, and controls them. The optical engine module includes, for example, a digital micromirror device (DMD). The DMD may accept a digital image and project the image without degrading the image quality.

The first optical sensor 230 and the second optical sensor 240 are, for example, light detection and ranging (LiDAR) which is an optical remote sensing technology. The LiDAR illuminates a beam of light at the target and measures the time difference between the light reaching the target object and being reflected back, thereby detecting the distance between the LiDAR and the target object. In addition, the first optical sensor 230 and the second optical sensor 240 may also be infrared cameras, visible light cameras or millimeter wave radars, but are not limited thereto.

In an embodiment, the vehicle auxiliary apparatus 100A further includes a storage equipment. For example, the storage equipment may use any types of a fixed or a removable random access memory (RAM), a read-only memory (ROM), a flash memory, a secure digital card, a hard drive or other similar apparatuses or a combination of these apparatuses. At least one program code fragment is stored in the storage equipment. After the program code fragment is installed, the processor 210 executes the vehicle auxiliary method described below.

In an embodiment, the first optical sensor 230 is disposed on a first side in a moving direction of the vehicle 100. The second optical sensor 240 is disposed on a second side in the moving direction of the vehicle 100. For example, the first optical sensor 230 is disposed on the same side as a rear headlight of the vehicle 100, and the second optical sensor 240 is disposed on the same side as a front headlight of the vehicle 100. The projection system 220 is disposed on the same side as the rear light of the vehicle 100 and is configured to project to the rear of the vehicle 100 to warn the vehicle coming from behind. The vehicle 100 may adopt an adaptive driving beam (ADB) headlamp.

In addition, in the embodiment shown in FIG. 2, the projection apparatus 221 may be disposed in the rear light on a left side of the vehicle 100, and the projection apparatus 222 may be disposed in the rear light on a right side of the vehicle 100. Accordingly, the vehicle auxiliary apparatus 100A may be used in the existing vehicle structure without additionally designing space to accommodate the projection system 220. If the projection system 220 only includes a projection apparatus, for example, a space for accommodating the projection system 220 may be disposed in the middle of the left and right rear lights.

In an embodiment, the vehicle auxiliary apparatus 100A is, for example, a central control computer of the vehicle 100. The central control computer is, for example, an electronic control unit (ECU). The ECU is said to be an embedded computer used to control major systems in the vehicle 100. The internal elements of the ECU include various sensors such as microcontrollers (MCU), input/output (I/O) circuits, analog-to-digital converters (ADC), power supply devices, and in-vehicle communication circuits. The sensors are, for example, optical radars, image sensors, millimeter wave radars, acceleration sensors, angular velocity sensors, wheel speed sensors, and tire pressure sensors.

FIG. 3 is a flow chart of a vehicle auxiliary method according to an embodiment of the disclosure. FIG. 4 is a schematic diagram of vehicle driving conditions according to an embodiment of the disclosure. In this embodiment, the vehicle auxiliary apparatus 100A is installed in the vehicle 100, and the vehicle 100 moves towards a direction 41. A first moving vehicle 400A is behind the vehicle 100, and a second moving vehicle 400B is in front of the vehicle 100.

Referring to FIG. 3, in step S305, a first vehicle speed of the first moving vehicle 400A other than the vehicle 100 is measured through the first optical sensor 230. Next, in step S310, a second vehicle speed of the second moving vehicle 400B other than the vehicle 100 is measured through the second optical sensor 240. Afterwards, in step S315, the projection system 220 disposed in the vehicle 100 is controlled to perform a warning projection within a projection range based on the first vehicle speed, the second vehicle speed, and the vehicle speed of the vehicle 100.

Taking the structure shown in FIG. 2 as an example, a projection image 410 is projected to the rear of the vehicle 100 through the projection apparatuses 221 and 222. Accordingly, the first moving vehicle 400A may be reminded to maintain a safe distance through the projection pattern 410.

Specifically, the first vehicle speed and a first instantaneous acceleration of the first moving vehicle 400A is measured through the first optical sensor 230. For example, the first optical sensor 230 detects that the first vehicle speed of the first moving vehicle 400A is V1' at time t0, and detects that the first vehicle speed is V1 at time t1, then the first instantaneous acceleration Acc1=(V1−V1')/(t1−t0) between time t0 and time t1. Moreover, the second vehicle speed V2 of the second moving vehicle 400B is measured through the second optical sensor 240 at time t1. In addition, the processor 210 obtains a vehicle instantaneous acceleration Acc0 of the vehicle 100 from a central control computer 100B of the vehicle 100. For example, the central control computer 100B of the vehicle 100 calculates the instantaneous acceleration of the vehicle Acc0=(V0−V0')/(t1-t0)

when learning the vehicle speed V0' of the vehicle at time to and the vehicle speed V0 of the vehicle at time t1.

The processor 210 calculates a first distance S1 based on the first vehicle speed V1, the first instantaneous acceleration Acc1, and the vehicle speed V0. For example, the first distance S1 is obtained by the following formula:

$$S1 = \frac{V1^2 - V0^2}{2 \times Acc1}.$$

Assuming that the first speed V1 is 120 km/h, the vehicle speed is 100 km/h, and the first instantaneous acceleration Acc1 is 5 m/s, then $$S1 = \frac{(120^2 - 100^2) \times 1/3.6}{2 \times 5} = 222.22 \ (m),$$

where 1 km/h=1/3.6 m/s.

Furthermore, the processor 210 calculates a second distance S2 based on the second vehicle speed V2, the vehicle speed V0, and the vehicle instantaneous acceleration Acc0 of the vehicle 100. For example, the second distance S2 is obtained by the following formula:

$$S2 = \frac{V2^2 - V0^2}{2 \times Acc0}.$$

Afterwards, the processor 210 obtains a braking distance DA1 based on the first distance S1 and the second distance S2. The first distance S1 is a safe parking distance of the first moving vehicle 400A behind the vehicle 100 relative to the vehicle 100, and the second distance S2 is a safe parking distance of the second moving vehicle 400B in front of the vehicle 100 relative to the vehicle 100. For example, the following formula is used to obtain the braking distance DA1:

$$DA1 = S1 + Kfactor \times S2,$$

where the parameter Kfactor varies with different vehicles 100. For example, different car manufacturers and different car models have different braking performance. For car models with better braking performance, the value of the parameter Kfactor is set to a larger value. For car models with average braking performance, the value of the parameter Kfactor is set to a smaller value. This is because if the braking performance of the vehicle 100 is better, the required warning distance becomes larger for the vehicle coming from behind (that is, the first moving vehicle 400A).

In addition, the processor 210 may be disposed to repeatedly execute steps S305 to S315 at a specified time interval to dynamically change the range of the projection pattern 410.

Figure 5:
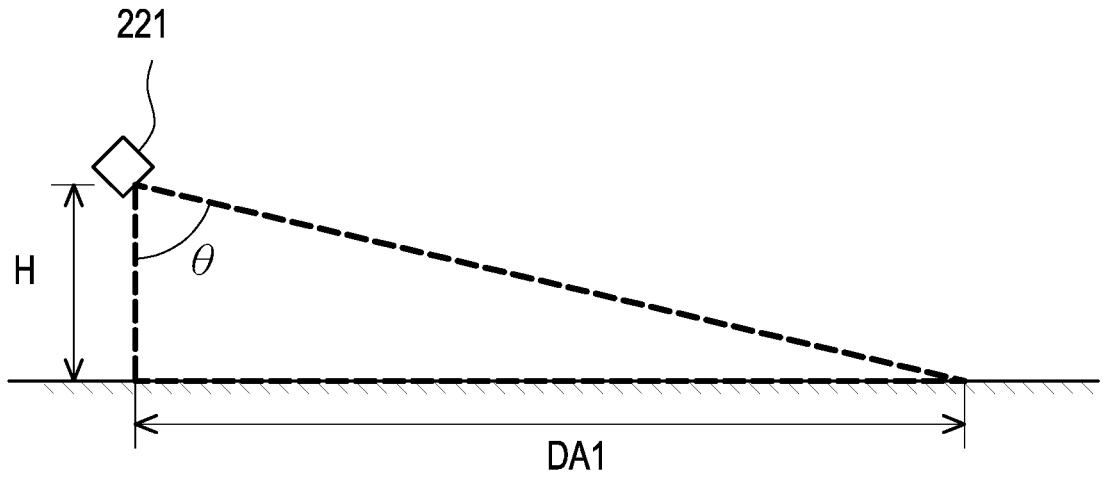
FIG. 5 is a schematic diagram of calculation of a projection angle of a projection system according to an embodiment of the disclosure.

FIG. 5 is a schematic diagram of calculation of a projection angle of a projection system according to an embodiment of the disclosure. In this embodiment, the projection apparatus 221 is taken as an example for explanation. However, the other projection apparatus 222 in the projection system 220 may also be deduced in the same way.

Referring to FIG. 5, a height between the projection apparatus 221 and a road surface is H (known before the vehicle 100 leaves the factory). The processor 210 calculates an adjustment angle θ based on the height H between the projection apparatus 221 and the road surface and the braking distance DA1. For example, the processor 210 calculates the adjustment angle θ based on tan θ=H/DA1. Afterwards, the processor 210 drives a motor corresponding to each projection apparatus 221 and 222 in the projection system 220 based on the adjustment angle θ, thereby adjusting the projection angle of each projection apparatus 221 and 222. Accordingly, each projection apparatus 221 and 222 projects a projection pattern 410 within the projection range at the projection angle.

Figure 6:
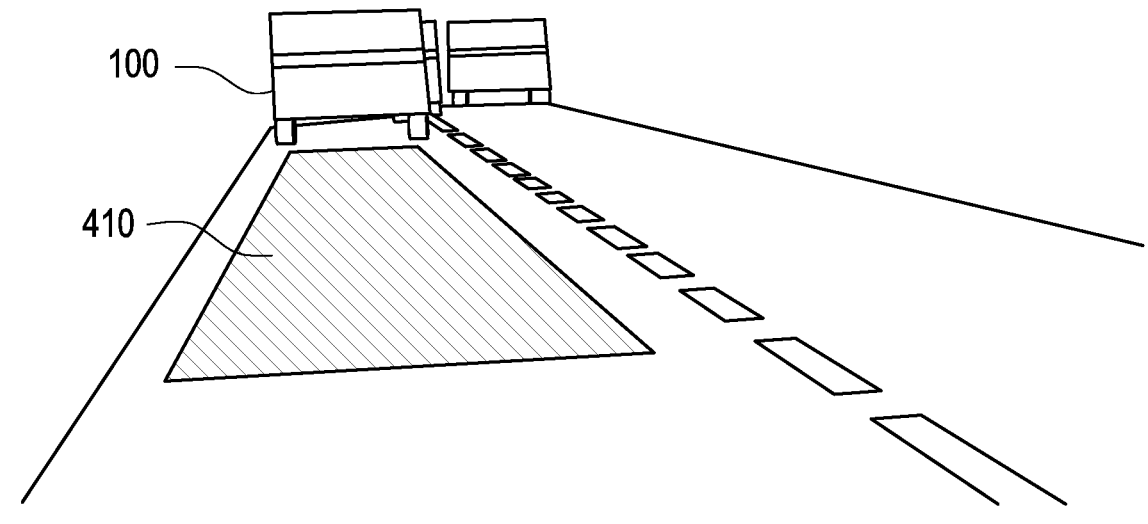
FIG. 6 is a schematic diagram of a front vehicle from a perspective of a vehicle coming from behind according to an embodiment of the disclosure.

FIG. 6 is a schematic diagram of a front vehicle from a perspective of a vehicle coming from behind according to an embodiment of the disclosure. This embodiment is an example of viewing the vehicle 100 from the perspective of the first moving vehicle 400A. As shown in FIG. 6, the projection pattern 410 is projected on the rear of the vehicle 100 to warn the vehicle coming from behind, that is, the driver of the first moving vehicle 400A.

In addition, in another embodiment, the processor 210 may further add the braking distance DA1 and at least one retention distance to obtain the warning distance. The retention distance allows the driver of the rear vehicle to have a reaction time period. For example, one or two additional retention distances may be added as appropriate, and the respective corresponding areas in the projection pattern are presented with different visions for the braking distance DA1 and the retention distance.

Figure 7:
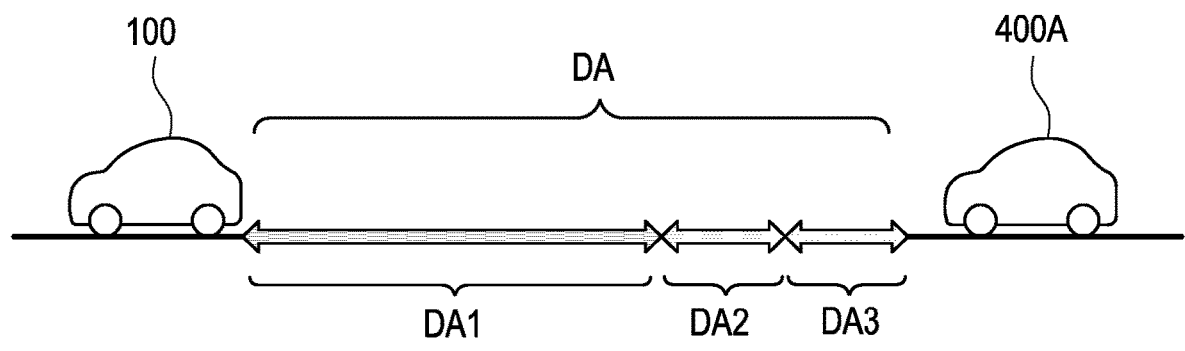
FIG. 7 is a schematic diagram of a warning distance according to an embodiment of the disclosure.
Figure 8:
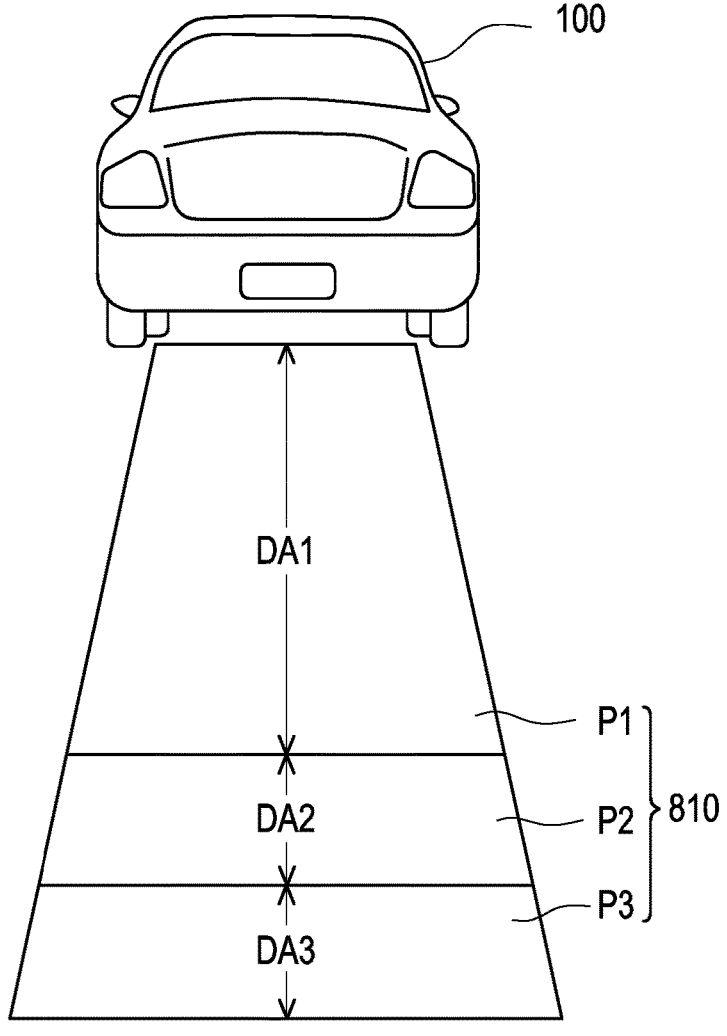
FIG. 8 is a schematic diagram of a projection pattern based on a warning distance according to an embodiment of the disclosure.

FIG. 7 is a schematic diagram of a warning distance according to an embodiment of the disclosure. FIG. 8 is a schematic diagram of a projection pattern based on a warning distance according to an embodiment of the disclosure. Referring to FIG. 7 and FIG. 8, in this embodiment, the processor 210 adds the braking distance DA1, the retention distance DA2, and the retention distance DA3 to obtain a warning distance DA. Similar to the embodiment shown in FIG. 5, the processor 210 may calculate the adjustment angle θ based on tan θ=H/DA. The projection angle of each projection apparatus 221 and 222 is adjusted by driving the motor corresponding to each projection apparatus 221 and 222 in the projection system 220 based on the adjustment angle θ, so that each projection apparatus 221 and 222 projects a projection pattern 810 within the projection range at the projection angle. In this embodiment, the projection pattern 810 includes a main area P1 and two secondary areas P2 and P3. The main area P1 corresponds to the braking distance DA1, and the two secondary areas P2 and P3 correspond to the retention distances DA2 and DA3 respectively. The main area P1 and the secondary areas P2 and P3 have different visual presentations. For example, different colors are used to differentiate. In an embodiment, the main area P1 is presented in red, the secondary area P2 is presented in yellow, and the secondary area P3 is presented in green. In addition, the colors of the main area P1 and the secondary areas P2 and P3 may also be displayed in gradation. It is worth mentioning that the retention distance DA2 and the retention distance DA3 may be preset fixed distances and may be pre-stored in the vehicle auxiliary apparatus 100A. That is, no matter how long the braking distance DA1 is, the retention distance DA2 and the retention distance DA3 remain unchanged, but are not limited thereto.

In addition, in another embodiment, the processor 210 calculates the relative acceleration Racc based on the first instantaneous acceleration Acc1 of the first moving vehicle

400A and the vehicle instantaneous acceleration Acc0 of the vehicle 100. For example: the relative acceleration Racc=Acc0-Acc1. A reference speed Va is calculated based on the relative acceleration Racc, the current distance D between the vehicle 100 and the first moving vehicle 400A, and the vehicle speed V0. For example, the reference speed Va is calculated based on the following formula:

$$Va = SQRT \left( V0^2 \times Racc \times Dis \right),$$

where SQRT is a root mean square function, that is, Va=$\sqrt{VV0^2+2\times Racc\times Dis}$.

The reference speed is a recommended speed reduction value for the first moving vehicle 400A behind the vehicle 100. After the reference speed is calculated, the reference speed is presented on a rear windshield of the vehicle 100 through a display technology. For example, the vehicle auxiliary apparatus 100A further includes an in-vehicle projection apparatus. The in-vehicle projection apparatus is coupled to the processor 210 and is configured to project the reference speed onto the rear windshield. In another embodiment, the rear windshield is equipped with a display. The display is coupled to the processor 210 which is configured to output the reference speed to the display.

Figure 9:
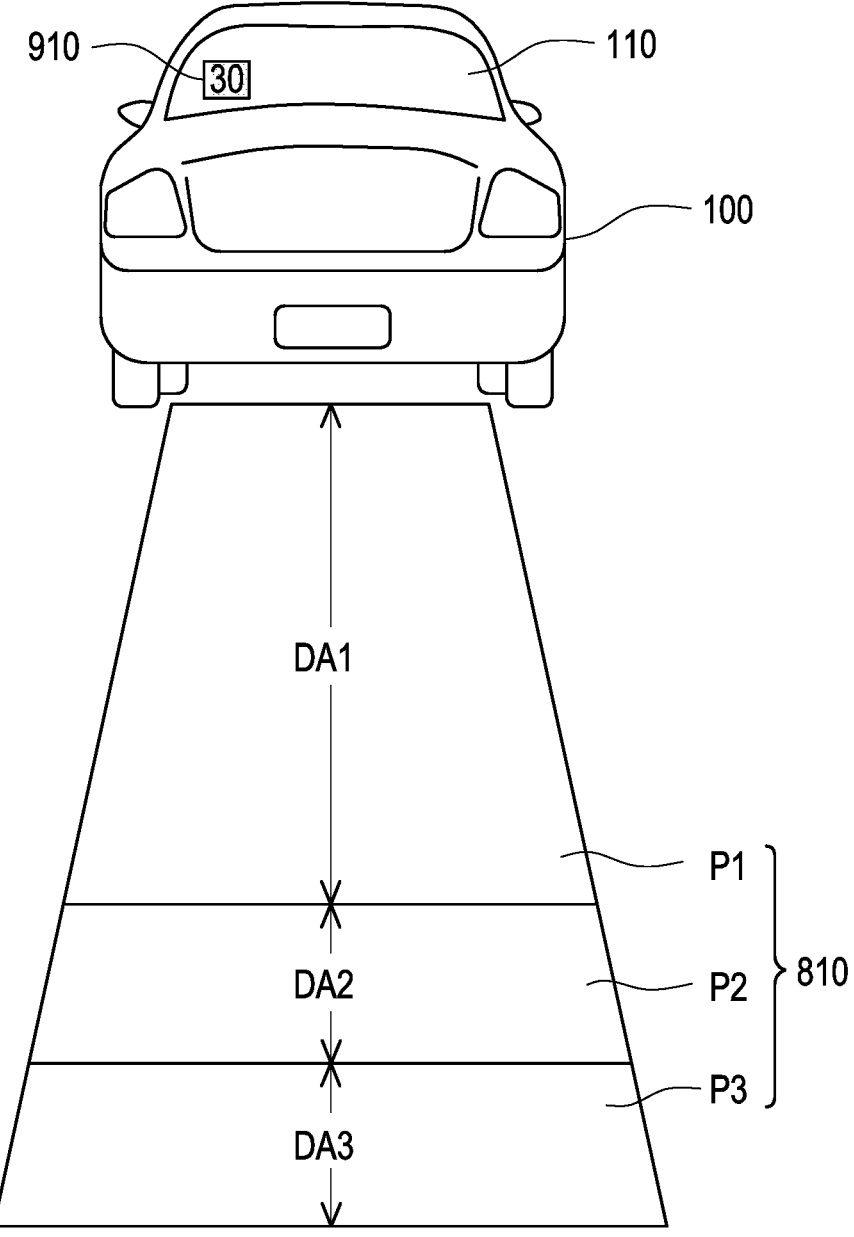
FIG. 9 is a schematic diagram of a warning projection according to an embodiment of the disclosure.

FIG. 9 is a schematic diagram of a warning projection according to an embodiment of the disclosure. Referring to FIG. 9, the reference speed is displayed in an area 910 through the display technology on the rear windshield 110 of the vehicle 100 to give the driver of the rear first moving vehicle 400A a reference.

In addition, the processor 210 may further calculate the warning time Ta=Dis/V1 based on the current distance Dis between the vehicle 100 and the first moving vehicle 400A and the first vehicle speed V1, and the warning time is presented on the rear windshield 110 through the display technology. For example, the warning time is displayed in the area 910. The area 910 may only display the reference speed or the warning time or may display both the reference speed and the warning time.

In addition, the processor 210 determines whether to perform the warning projection through the projection system 220 based on whether the vehicle speed of the vehicle 100 is greater than a preset value. The warning projection is performed in response to the vehicle speed of the vehicle 100 being greater than the preset value. The warning projection is not performed in response to the vehicle speed of the vehicle 100 being not greater than the preset value. That is, the steps S305 to S315 are not executed when the moving speed of the vehicle 100 is slow.

Alternatively, the processor 210 determines whether to perform the warning projection through the projection system 220 based on whether the distance between the vehicle 100 and the first moving vehicle 400A located behind the vehicle 100 is greater than a safe distance. The warning projection is performed in response to the distance between the vehicle 100 and the first moving vehicle 400A being not greater than the safe distance. The warning projection is not performed in response to the distance between the vehicle 100 and the first moving vehicle 400A being greater than the safe distance. That is, the steps S305 to S315 are not executed when the distance between the vehicle 100 and the rear vehicle is far. For example, the first optical sensor 230 senses that the first moving vehicle 400A is a large vehicle or a small vehicle, and then the processor 210 adjusts the safe distance at the first vehicle speed and the second vehicle speed. For example, the first moving vehicle 400A is a large vehicle and is adjusted to increase the safe distance, but is not limited thereto.

The warning projection may be a three-dimensional projection or a two-dimensional projection. Alternatively, the warning projection is in the form of the three-dimensional projection while the vehicle 100 is traveling, and the warning projection is in the form of the two-dimensional projection when the vehicle 100 is stopped.

To sum up, this disclosure measures the vehicle speeds of the front vehicle and the rear vehicle through the two optical sensors and controls the projection system to perform the warning projection based on the vehicle speeds of the front vehicle and the rear vehicle and the vehicle speed of the vehicle, which allows the rear vehicle to instantly and intuitively identify the safe distance from the front vehicle so as to respond to braking actions and maintain driving safety. In addition, this disclosure may continuously detect, provide feedback, and operate in an uninterrupted cycle to change the safe distance of the warning area in a timely manner. This disclosure also presents the danger levels through the projection colors. The warning color is intuitive, clear, and easy to identify. The driver of the rear vehicle may further see the recommended speed reduction value of the vehicle and may drive the vehicle in a safe environment.

What is claimed is:

1. A vehicle auxiliary apparatus, comprising:
a first optical sensor, disposed on a first side in a moving direction of a vehicle;
a second optical sensor, disposed on a second side in the moving direction of the vehicle, wherein the second side is different from the first side;
a projection system; and
a processor, coupled to the first optical sensor, the second optical sensor, and the projection system, wherein the processor is configured to:
measure a first vehicle speed of a first moving vehicle other than the vehicle through the first optical sensor;
measure a second vehicle speed of a second moving vehicle other than the vehicle through the second optical sensor; and
control the projection system to perform a warning projection within a projection range based on the first vehicle speed, the second vehicle speed, and a vehicle speed of the vehicle, wherein performing the warning projection comprises:
calculate a braking distance based on the first vehicle speed, the second vehicle speed, and the vehicle speed;
calculate an adjustment angle based on a height of the projection system and a road surface and the braking distance; and
adjust a projection angle of each projection apparatus by driving a motor corresponding to each projection apparatus in the projection system based on the adjustment angle, so that each projection apparatus projects a projection pattern within the projection range at the projection angle.

2. The vehicle auxiliary apparatus according to claim 1, wherein the first moving vehicle is located behind the vehicle, and the second moving vehicle is located in front of the vehicle, and
the processor is configured to:
calculate a first distance based on the first vehicle speed, a first instantaneous acceleration, and the vehicle speed, wherein the first instantaneous acceleration is obtained by measuring the first moving vehicle through the first optical sensor;
calculate a second distance based on the second vehicle speed, the vehicle speed, and a vehicle instantaneous acceleration of the vehicle; and
obtain the braking distance based on the first distance and the second distance.

3. The vehicle auxiliary apparatus according to claim 1, wherein the processor is configured to:
add the braking distance and at least one retention distance to obtain a warning distance; and
calculate the adjustment angle based on the height of the projection system and the road surface and the warning distance wherein the projection pattern comprises a main area and at least one secondary area, the main area corresponds to the braking distance, the at least one secondary area corresponds to the at least one retention distance, and the main area and the at least one secondary area have different visual presentations.

4. The vehicle auxiliary apparatus according to claim 1, wherein the first moving vehicle is located behind the vehicle, the second moving vehicle is located in front of the vehicle, and the processor is configured to:
calculate a relative acceleration based on a first instantaneous acceleration of the first moving vehicle and a vehicle instantaneous acceleration of the vehicle;
calculate a reference speed based on the relative acceleration, a current distance between the vehicle and the first moving vehicle, and the vehicle speed; and
present the reference speed on a rear windshield of the vehicle through a display technology.

5. The vehicle auxiliary apparatus according to claim 4, wherein the processor is configured to:
calculate a warning time based on the current distance between the vehicle and the first moving vehicle and the first vehicle speed; and
present the warning time on the rear windshield through the display technology.

6. The vehicle auxiliary apparatus according to claim 4, further comprising:
an in-vehicle projection apparatus, coupled to the processor and configured to project the reference speed onto the rear windshield.

7. The vehicle auxiliary apparatus according to claim 4, wherein the rear windshield is equipped with a display, and the display is coupled to the processor; and
the processor is configured to output the reference speed to the display.

8. The vehicle auxiliary apparatus according to claim 1, wherein the processor is configured to:
determine whether to perform the warning projection through the projection system based on whether the vehicle speed of the vehicle is greater than a preset value, wherein the warning projection is performed in response to the vehicle speed of the vehicle being greater than the preset value, and the warning projection is not performed in response to the vehicle speed of the vehicle being not greater than the preset value; or
determine whether to perform the warning projection through the projection system based on whether a distance between the vehicle and the first moving vehicle located behind the vehicle is greater than a safe distance, wherein the warning projection is performed in response to the distance being not greater than the safe distance, and the warning projection is not performed in response to the distance being greater than the safe distance.

9. The vehicle auxiliary apparatus according to claim 1, wherein the projection system comprises two projection apparatuses respectively disposed on two rear lights of the vehicle.

10. A vehicle auxiliary method, executed by a processor disposed in a vehicle, the vehicle auxiliary method comprising:

measuring a first vehicle speed of a first moving vehicle other than the vehicle through a first optical sensor, wherein the first optical sensor is disposed on a first side in a moving direction of the vehicle;

measuring a second vehicle speed of a second moving vehicle other than the vehicle through a second optical sensor, wherein the second optical sensor is disposed on a second side in the moving direction of the vehicle, and the second side is different from the first side; and controlling a projection system disposed in the vehicle to perform a warning projection within a projection range based on the first vehicle speed, the second vehicle speed, and a vehicle speed of the vehicle, wherein performing the warning projection comprises:

calculating a braking distance based on the first vehicle speed, the second vehicle speed, and the vehicle speed;

calculating an adjustment angle based on a height of the projection system and a road surface and the braking distance; and adjusting a projection angle of each projection apparatus by driving a motor corresponding to each projection apparatus in the projection system based on the adjustment angle, so that each projection apparatus projects a projection pattern within the projection range at the projection angle.

11. The vehicle auxiliary method according to claim 10, wherein the first moving vehicle is located behind the vehicle, and the second moving vehicle is located in front of the vehicle, calculating the braking distance based on the first vehicle speed, the second vehicle speed, and the vehicle speed comprises:

calculating a first distance based on the first vehicle speed, a first instantaneous acceleration, and the vehicle speed, wherein the first instantaneous acceleration is obtained by measuring the first moving vehicle through the first optical sensor;

calculating a second distance based on the second vehicle speed, the vehicle speed, and a vehicle instantaneous acceleration of the vehicle; and obtaining the braking distance based on the first distance and the second distance.

12. The vehicle auxiliary method according to claim 10, wherein controlling the projection range of the projection system disposed in the vehicle based on the first vehicle speed, the second vehicle speed, and the vehicle speed of the vehicle comprises:

adding the braking distance and at least one retention distance to obtain a warning distance; and calculating the adjustment angle based on the height of the projection system and the road surface and the warning distance, wherein the projection pattern comprises a main area and at least one secondary area, the main area corresponds to the braking distance, the at least one secondary area corresponds to the at least one retention distance, and the main area and the at least one secondary area have different visual presentations.

13. The vehicle auxiliary method according to claim 10, wherein the first moving vehicle is located behind the vehicle, and the second moving vehicle is located in front of the vehicle, and the vehicle auxiliary method further comprises:

calculating a relative acceleration based on a first instantaneous acceleration of the first moving vehicle and a vehicle instantaneous acceleration of the vehicle;

calculating a reference speed based on the relative acceleration, a current distance between the vehicle and the first moving vehicle, and the vehicle speed; and presenting the reference speed on a rear windshield of the vehicle through a display technology.

14. The vehicle auxiliary method according to claim 13, further comprising:

calculating a warning time based on the current distance between the vehicle and the first moving vehicle and the first vehicle speed; and presenting the warning time on the rear windshield through the display technology.

15. The vehicle auxiliary method according to claim 13, wherein the display technology is a projection technology, and presenting the reference speed on the rear windshield of the vehicle comprises:

projecting the reference speed onto the rear windshield through an in-vehicle projection apparatus.

16. The vehicle auxiliary method according to claim 13, wherein the display technology comprises equipping the rear windshield with a display, and presenting the reference speed on the rear windshield of the vehicle comprises:

outputting the reference speed to the display.

17. The vehicle auxiliary method according to claim 10, further comprising:

determining whether to perform the warning projection through the projection system based on whether the vehicle speed of the vehicle is greater than a preset value, wherein the warning projection is performed in response to the vehicle speed of the vehicle being greater than the preset value, and the warning projection is not performed in response to the vehicle speed of the vehicle being not greater than the preset value; or determining whether to perform the warning projection through the projection system based on whether a distance between the vehicle and the first moving vehicle located behind the vehicle is greater than a safe distance, wherein the warning projection is performed in response to the distance being not greater than the safe distance, and the warning projection is not performed in response to the distance being greater than the safe distance.

18. The vehicle auxiliary method according to claim 10, wherein the projection system comprises two projection apparatuses respectively disposed on two rear lights of the vehicle.

* * * * *